(12) United States Patent
Ficarella et al.

(10) Patent No.: US 10,190,553 B2
(45) Date of Patent: Jan. 29, 2019

(54) PUMPING UNIT FOR FEEDING FUEL, PREFERABLY DIESEL FUEL, FROM A STORAGE TANK TO AN INTERNAL COMBUSTION ENGINE

(71) Applicant: Robert Bosch GmbH, Stuttgart (DE)

(72) Inventors: Giuseppe Ficarella, Bari (IT); Nello Medoro, Trinitapoli (IT)

(73) Assignee: Robert Bosch GmbH, Stuttgart (DE)

( * ) Notice: Subject to any disclaimer, the term of this patent is extended or adjusted under 35 U.S.C. 154(b) by 309 days.

(21) Appl. No.: 15/038,106

(22) PCT Filed: Nov. 5, 2014

(86) PCT No.: PCT/EP2014/073843
§ 371 (c)(1),
(2) Date: May 20, 2016

(87) PCT Pub. No.: WO2015/074878
PCT Pub. Date: May 28, 2015

(65) Prior Publication Data
US 2016/0281661 A1  Sep. 29, 2016

(30) Foreign Application Priority Data

Nov. 20, 2013  (IT) .................................. 2013A1923

(51) Int. Cl.
| F02M 37/18 | (2006.01) |
| F04B 23/10 | (2006.01) |
| B01D 35/00 | (2006.01) |
| F02M 37/00 | (2006.01) |

(Continued)

(52) U.S. Cl.
CPC ........... F02M 37/18 (2013.01); B01D 35/005 (2013.01); F02M 37/0029 (2013.01);
(Continued)

(58) Field of Classification Search
CPC ........ F02M 37/18; F02M 37/06; F02M 37/22; F02M 37/041; F02M 37/043;
(Continued)

(56) References Cited

U.S. PATENT DOCUMENTS

| 2006/0169251 A1* | 8/2006 | Mori ...................... F02M 37/22 123/446 |
| 2010/0108029 A1* | 5/2010 | Rollinger ................ F02D 41/22 123/350 |

(Continued)

FOREIGN PATENT DOCUMENTS

| EP | 1298307 | 4/2003 |
| EP | 1469190 | 10/2004 |

(Continued)

OTHER PUBLICATIONS

International Search Report for Application No. PCT/EP2014/073843 dated Feb. 2, 2015 (2 pages).

*Primary Examiner* — Sizo Vilakazi
(74) *Attorney, Agent, or Firm* — Michael Best & Friedrich LLP

(57) ABSTRACT

A pumping unit has a fuel storage tank (2), a piston pump (6) for feeding the fuel to an internal combustion engine (3); a gear pump (7) for feeding the fuel from the storage tank (2) to the piston pump (6), and a hydraulic circuit (46) which connects together the storage tank (2) and the internal combustion engine (3), extends through a pump body (8) of the piston pump (6) so as to lubricate an actuating shaft (36) of the piston pump (6) and has a collection branch (55) for collecting the fuel leaks resulting from the lubrication of said actuating shaft (36); the collection branch (55) being connected to an intake (37a) of the gear pump (7) so as to lubricate an actuating shaft (42) of the gear pump (7) with the fuel from said collection branch (55).

19 Claims, 3 Drawing Sheets

(51) Int. Cl.
  *F02M 37/04* (2006.01)
  *F02M 37/06* (2006.01)
  *F02M 37/22* (2006.01)
  *F02M 63/00* (2006.01)

(52) U.S. Cl.
  CPC .... *F02M 37/0052* (2013.01); *F02M 37/0082* (2013.01); *F02M 37/041* (2013.01); *F02M 37/043* (2013.01); *F02M 37/06* (2013.01); *F02M 37/22* (2013.01); *F02M 63/0001* (2013.01); *F04B 23/10* (2013.01)

(58) Field of Classification Search
  CPC .......... F02M 37/0082; F02M 37/0052; F02M 63/0001; F02M 37/0029; B01D 35/005; F04B 23/10
  See application file for complete search history.

(56) References Cited

U.S. PATENT DOCUMENTS

| | | | | |
|---|---|---|---|---|
| 2012/0132178 | A1* | 5/2012 | Ziegler | F02M 37/0017 123/509 |
| 2013/0291836 | A1* | 11/2013 | Klesse | F02D 41/3854 123/458 |
| 2014/0165957 | A1* | 6/2014 | Kwun | F02M 59/44 123/196 R |

FOREIGN PATENT DOCUMENTS

| | | |
|---|---|---|
| JP | 2010090797 A | 4/2010 |
| WO | 2009053364 | 4/2009 |
| WO | 2011012402 | 2/2011 |
| WO | 2012080334 | 6/2012 |

* cited by examiner

PUMPING UNIT FOR FEEDING FUEL, PREFERABLY DIESEL FUEL, FROM A STORAGE TANK TO AN INTERNAL COMBUSTION ENGINE

BACKGROUND OF THE INVENTION

The present invention relates to a pumping unit for feeding fuel, preferably diesel fuel, from a storage tank to an internal combustion engine.

In particular the present invention relates to a pumping unit of the type comprising a fuel storage tank; a high-pressure pump, in the case in question a piston pump, for feeding the fuel to an internal combustion engine; a pre-feed pump, in the case in question a gear pump, for feeding the fuel from the storage tank to the piston pump; and a hydraulic circuit for connecting together the storage tank and the internal combustion engine.

Operation of the gear pump and the piston pump is actuated by a transmission shaft comprising a first portion extending through a pump body of the piston pump and a second portion extending through a pump body of the gear pump.

The hydraulic circuit comprises a first branch for connecting together the storage tank and the gear pump; a second branch, which connects together the gear pump and the piston pump and extends through the pump body of the piston pump so as to lubricate the first portion of the transmission shaft; and a third branch for connecting together the piston pump and the internal combustion engine.

The hydraulic circuit further comprises a filtering device arranged along the second branch, for filtering the fuel fed to the pump body of the piston pump.

The fuel leaks resulting from the lubrication of the first portion of the transmission shaft are discharged into the storage tank via a fourth branch of the hydraulic circuit.

The fourth branch is connected to a delivery of the gear pump and is configured so that fuel trickling between the first portion of the transmission shaft and the associated support bearings has a pressure lower than the pressure of the fuel at the delivery of the gear pump. Consequently, the second portion of the transmission shaft is lubricated with the fuel supplied from the delivery of the gear pump, namely with a fuel flow directed from the delivery of the gear pump to the fourth branch.

The known pumping units of the type described above have a number of drawbacks mainly arising from the fact that the second portion of the transmission shaft is lubricated with the fuel from the delivery of the gear pump, namely with fuel drawn from the second branch of the hydraulic circuit ahead of the filtering device and, therefore, not yet filtered.

Consequently, any solid particles present in the fuel used to lubricate the second portion of the transmission shaft are fed between the pump body of the gear pump and the second portion of the transmission shaft causing wear of these components due to abrasion.

SUMMARY OF THE INVENTION

The object of the present invention is to provide a pumping unit for feeding fuel, preferably diesel fuel, from a storage tank to an internal combustion engine which does not have the drawbacks described above and which can be produced in a simple and low-cost manner.

According to the present invention a pumping unit for feeding fuel, in particular diesel fuel, from a storage tank to an internal combustion engine is provided.

BRIEF DESCRIPTION OF THE DRAWINGS

The present invention will now be described with reference to the accompanying drawings which illustrate a non-limiting example of embodiment thereof and in which.

DETAILED DESCRIPTION

Figure 1:
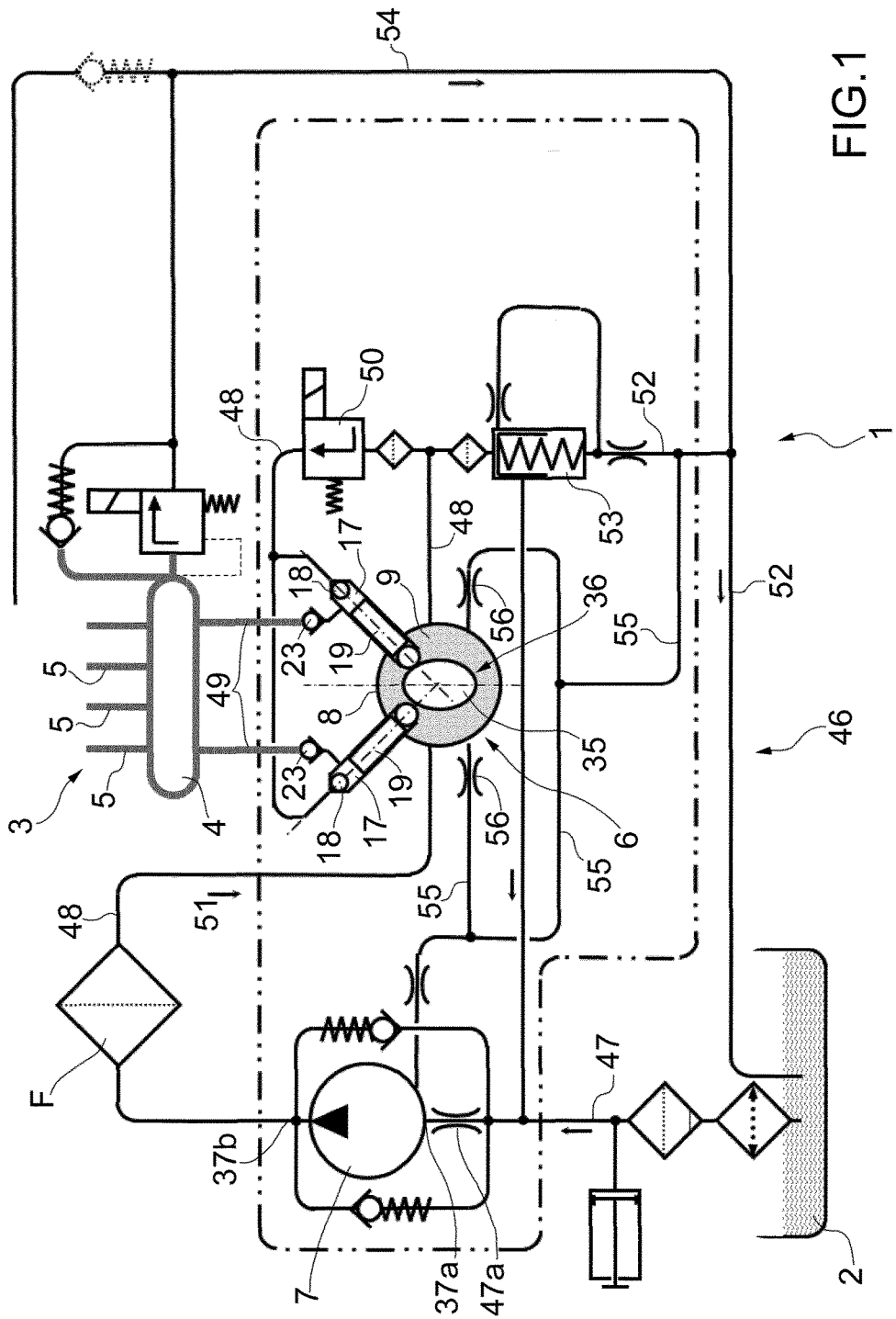
FIG. 1 is a hydraulic diagram of a preferred embodiment of the pumping unit according to the present invention.

With reference to FIG. 1, 1 denotes in its entirety a pumping unit for feeding a liquid fuel, preferably diesel fuel, from a storage tank 2 to an internal combustion engine 3, in the case in question a diesel combustion engine comprising a header 4 for distributing the fuel, commonly referred to by the term "common rail", and a plurality of injectors 5 connected to the header 4 and designed to atomize the fuel inside associated fuel chambers (not shown) of said engine 3.

The pumping unit 1 comprises a high-pressure pump 6, in the case in question a piston pump, designed to feed the fuel to the engine 3, and a low-pressure or pre-feed pump 7, in the case in question a gear pump, designed to feed the fuel from the tank 2 to the pump 6.

Figure 2:
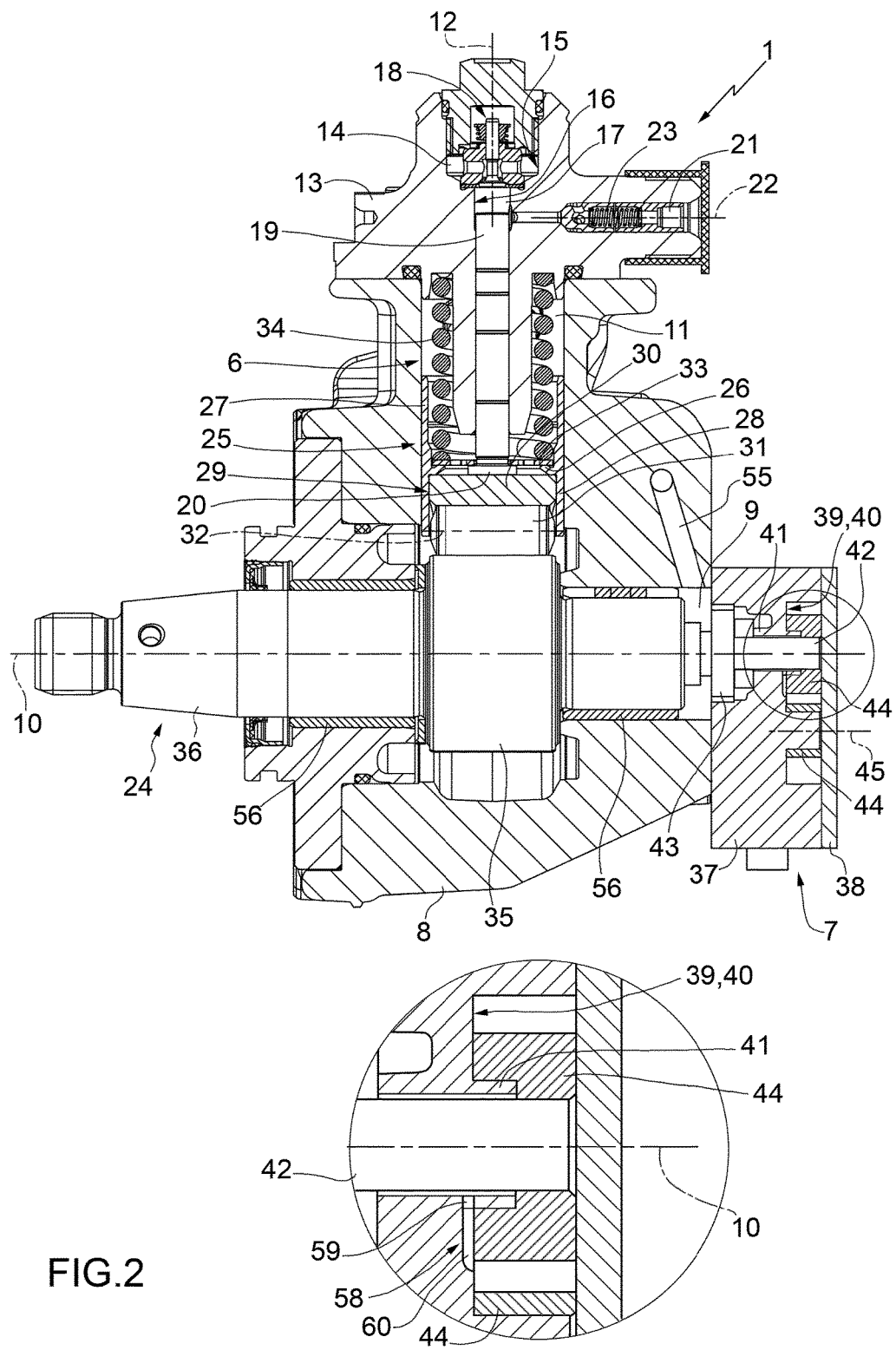
FIG. 2 is a schematic side view, with parts cross-sectioned, parts removed and parts enlarged for greater clarity, of the pumping unit according to FIG. 1.

In accordance with that shown in FIGS. 1 and 2, the pump 6 comprises a pump body 8, which has a central hole 9 with a longitudinal axis 10 and has, moreover, in the case in question, two side holes 11, each of which has a longitudinal axis 12 transverse to the axis 10 and extends radially towards the outside of the pump body 8 from said hole 9.

Each hole 11 is closed by a tubular end-piece 13 which projects inside the hole 11 coaxially with the axis 12 and has a central hole 14 comprising a widened portion 15 and a narrow portion 16 defining a cylinder 17 of the pump 6.

The portion 15 defines an intake duct for drawing in the fuel inside the cylinder 17 and seats internally an intake valve 18 of the known type designed to control selectively feeding of the fuel inside said cylinder 17.

The cylinder 17 is slidably engaged by a piston 19 which is mounted coaxially with the axis 12 and has a head 20 extending outside of said cylinder 17.

The end-piece 13 has moreover a delivery duct 21 which communicates with the cylinder 17, has a longitudinal axis 22 transverse to the axis 12 and seats internally a delivery valve 23 of the known type designed to control selectively feeding of the fuel to the engine 3.

The pistons 19 are displaced by an actuating device 24 along the associated cylinders 17 with a reciprocating rectilinear movement comprising an intake stroke for drawing the fuel into the cylinders 17 and a compression stroke for compressing the fuel contained inside the said cylinders 17.

The device 24 comprises, for each piston 19, a respective tubular sleeve 25 which is slidably engaged inside the associated hole 11 coaxially with the axis 12, extends around the associated cylinder 17 and has an inner annular flange 26 which projects radially from an inner surface of the sleeve 25 and divides said sleeve 25 into two cylindrical portions 27, 28, the portion 28 of which faces the hole 9.

The device 24 has moreover a tappet assembly 29 comprising a substantially cylindrical form-fitting block 30, which is retained by means of interference inside the portion 28 and is arranged in contact with the flange 26, and a tappet roller 31 which projects from the block 30 towards the hole 9 and is rotatably coupled with the block 30 so as to rotate, relative to said block 30, about its longitudinal axis 32 substantially perpendicular to the axis 12.

The flange 26 supports an annular element 33 which extends around the piston 19, is inserted inside the portion 27 of the sleeve 25 coaxially with the axis 12 and has an outer perimetral edge axially facing the flange 26 and an inner perimetral edge axially facing the head 20.

The device 24 comprises furthermore a compression spring 34 which is mounted between the end-piece 13 and the sleeve 25 coaxially with the axis 12 and is arranged between the end-piece 13 and the element 33 so as to move, and normally keep, the element 33 in contact with the flange 26 and the roller 31 in contact with a cam 35.

The cam 35 is formed on an outer surface of an intermediate portion of a transmission shaft 36, which is common to the two pistons 19 and is mounted through the hole 9 so as to rotate, relative to the pump body 8, about the axis 10.

Figure 3:
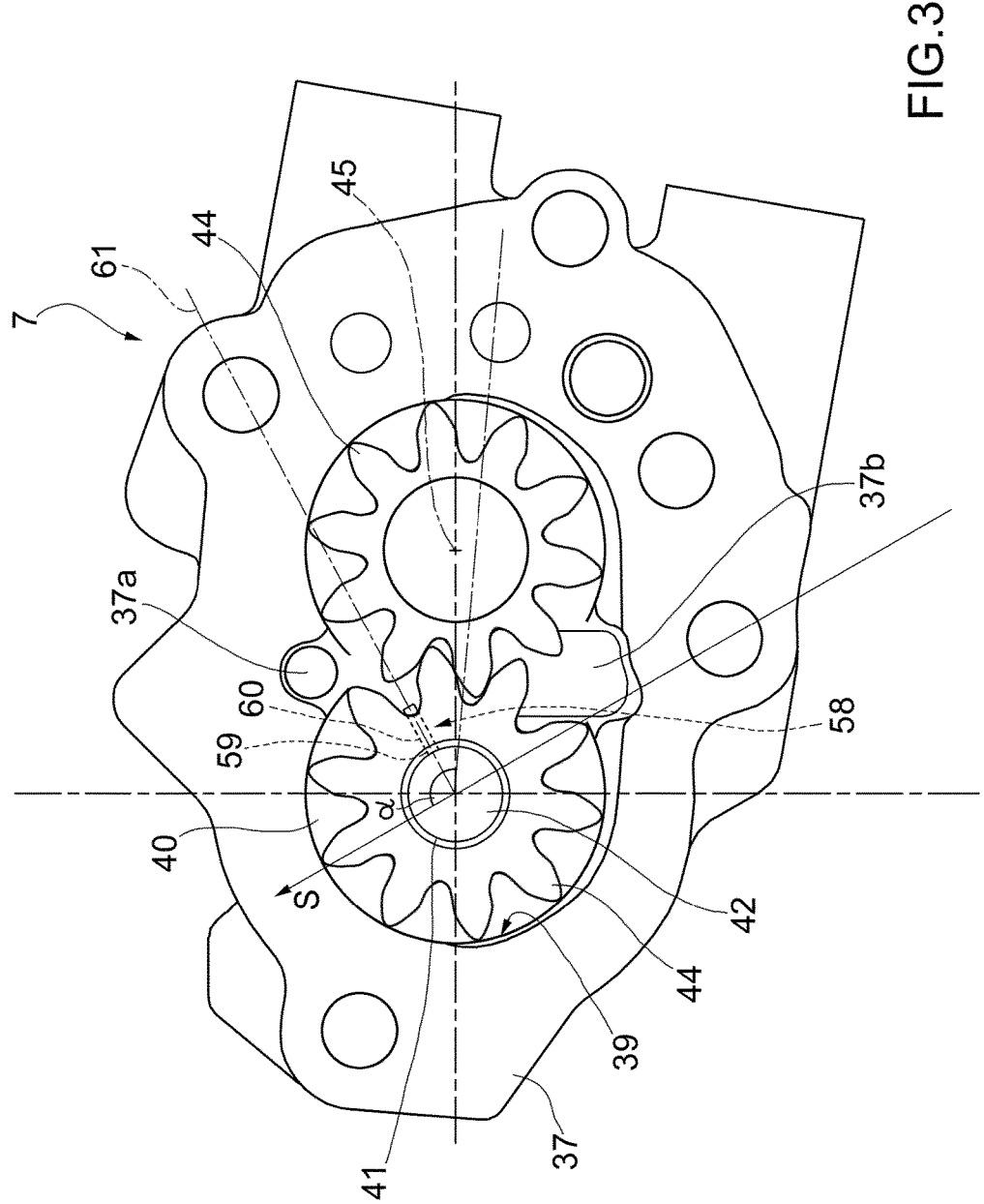
FIG. 3 is a schematic front view, with parts removed for greater clarity, of a detail of FIG. 2.

With reference to FIGS. 2 and 3, the pump 7 comprises a pump body 37 which is fixed to the pump body 8, has a cup-shaped form and is closed by a cover 38 mounted perpendicularly with respect to the axis 10.

The pump body 37 is provided with an intake 37a for drawing the fuel into the pump 7 and with a delivery 37b for delivering the fuel to the pump 6 and has a cavity 39 limited by an end wall 40 substantially perpendicular to the axis 10.

The pump body 37 has a tubular bush 41 which extends through the wall 40 so as to connect together the hole and the cavity 39 and is engaged rotatably by a transmission shaft 42, which is connected to the shaft 36 by means of a coupling 43 arranged in between, and is mounted so as to rotate about the axis 10 owing to the thrust of said shaft 36.

Obviously, according to a variant not shown, the two transmission shafts 36, 42 may be eliminated and replaced with a single transmission shaft comprising two portions seated inside the pump body 8 and the pump body 37, respectively.

The pump body 37 seats internally a pair of gears 44, one of which is keyed onto the shaft 37 and the other one of which is mounted so as to rotate about its longitudinal axis 45 parallel to the axis 10.

The pumping unit 1 further comprises a hydraulic circuit 46 for feeding the fuel, comprising in turn a first branch 47 for connecting together the tank 2 and the pump 7; a second branch 48, which connects together the pumps 6 and 7, extends through the pump body 8 so as to lubricate the shaft 36 and is connected to the cylinders 17 by means of the associated valves 18; and a third branch 49, which extends between the pump 6 and the header 4 and is connected to the cylinders 17 by means of the associated valves 23.

The branch 47 has a calibrated hole 47a so that the pressure of the fuel at the intake 37a is slightly below atmospheric pressure and therefore the pressure of the fuel inside the tank 2.

The branch 48 is provided with a metering electrovalve 50 which is mounted ahead of the valves 18 in a direction 51 of feeding of the fuel along the branches 47, 48 and 49, is movable between a closed position and an open position of the branch 48 and is designed to control selectively the instantaneous flowrate of fuel fed to the cylinders 17 depending on the values of a plurality of operating parameters of the engine 3.

The branch 48 is provided furthermore with a filtering device F mounted ahead of the pump body 8 in the direction 51, for filtering the fuel fed from the pump 7 to the pump 6.

The circuit 46 further comprises a fourth branch 52 which connects the branch 48 ahead of the electrovalve 50 in the direction 51 to the tank 2, is provided with an overflow valve 53 and allows discharging into the tank 2 of at least part of the fuel flow in excess of that fed through the electrovalve 50.

The circuit 46 also has a fifth branch 54, which extends between the header 4 and the branch 52 and allows discharging into the tank 2 of the fuel flow in excess of that necessary for the injectors 5; and a sixth branch 55 for discharging into the branch 52, and therefore into the tank 2, the fuel which is fed through the pump body 8 by the branch 48 in order to lubricate the shaft 36 and trickles through the support bearings 56 (FIG. 2) of the said shaft 36.

The branch 55 is configured so that the fuel trickling through the bearings 56 has a pressure slightly above atmospheric pressure and therefore the pressure of the fuel inside the tank 2.

The branch 55 extends through the pump body 8, communicates with the hole 9 and is connected to the intake 37a of the pump 7 via a hydraulic duct 58.

The duct 58 is formed through the pump body 37 and comprises, in the case in question, a hole 59 formed through the tubular bush 41 and a groove 60 which is formed in the wall 40 and projects from a base circumference of the gearing 44 mounted on the shaft 42.

In the case in question the hole 59 and the groove 60 extend transversely with respect to the axis 10 and are aligned radially with each other.

Since the pressure of the fuel in the branch 55 is greater than the pressure of the fuel at the intake 37a of the pump 7, the shaft 42 is lubricated along the tubular bush 41 with the fuel from the branch 55, namely with a fuel flow directed from the branch 55 to the intake 37a.

In order to prevent flexing of the shaft 42 due to the force S generated on said shaft 42 by the difference in pressure between the delivery 37b and the intake 37a from closing the hole 59 and therefore the duct 58, the hole 59 has a longitudinal axis 61 arranged at an angle α of between 50° and 130°, preferably between 90° and 130°, in particular between 90° and 123°, relative to the direction of said force S.

The connection of the branch 55 to the intake 37a allows lubrication of the shaft 42 along the tubular bush 41 with the fuel filtered by the filtering device F and therefore free from solid particles which would cause wear of the tubular bush 41 and/or the shaft 42 due to abrasion.

The invention claimed is:

1. A pumping unit for feeding fuel from a storage tank (2) to an internal combustion engine (3), the pumping unit comprising:
    a high-pressure pump (6) for feeding the fuel to the internal combustion engine (3);
    a pre-feed pump (7) for feeding the fuel from the storage tank (2) to the high-pressure pump (6);
    a transmission shaft (36, 42) for actuating operation of the high-pressure pump (6) and the pre-feed pump (7), the transmission shaft (36, 42) comprising a first portion (36) extending through a pump body (8) of the high-pressure pump (6) and a second portion (42) extending through a pump body (37) of the pre-feed pump (7); and
    a hydraulic circuit (46) for connecting together the storage tank (2) and the internal combustion engine (3), the hydraulic circuit (46) comprising a first branch (47) for connecting together the storage tank (2) and the pre-feed pump (7), a second branch (48), which connects together the pre-feed pump (7) and the high-pressure pump (6), and extends through the pump body (8) of the high-pressure pump (6) so as to lubricate the first portion (36) of the transmission shaft (36, 42), a third branch (49) for connecting together the high-pressure pump (6) and the internal combustion engine (3), and a fourth branch (55) for discharging into the storage tank (2) fuel leaks resulting from lubrication of the first portion (36) of the transmission shaft (36, 42); wherein the fourth branch (55) is also connected to an intake (37a) of the pre-feed pump (7) so as to lubricate the second portion (42) of the transmission shaft (36, 42) with the fuel of the fourth branch (55);
wherein the pump body (37) of the pre-feed pump (7) comprises a tubular support bush (41) engaged rotatably by the second portion (42) of the transmission shaft (36, 42); the fourth branch (55) extending through the pump body (8) of the high-pressure pump (6) so as to be connected to the tubular support bush (41).

2. The pumping unit according to claim 1, further comprising a filtering device (F) mounted along the second branch (48), for filtering the fuel fed to the pump body (8) of the high-pressure pump (6).

3. The pumping unit according to claim 1, wherein a pressure of the fuel in the fourth branch (55) is greater than a pressure of the fuel at the intake (37a) of the pre-feed pump (7).

4. The pumping unit according to claim 1, wherein the first branch (47) is provided with at least a first constriction (47a) so that the pressure of the fuel at the intake (37a) of the pre-feed pump (7) is slightly below atmospheric pressure and wherein the fourth branch (55) is configured so that the pressure of the fuel in the fourth branch (55) is slightly above atmospheric pressure.

5. The pumping unit according to claim 1, further comprising at least one hydraulic duct (58) formed through the pump body (37) of the pre-feed pump (7) and connected to the tubular support bush (41) and to the intake (37a) of the pre-feed pump (7).

6. The pumping unit according to claim 5, wherein the pre-feed pump (7) is a gear pump comprising a gearing (44) mounted on the second portion (42) of the transmission shaft (36, 42) and seated inside a cavity (39) formed in the pump body (37) of the pre-feed pump (7) and limited by an end wall (40); the hydraulic duct (58) being formed at least partly on the end wall (40).

7. The pumping unit according to claim 6, wherein the hydraulic duct (58) comprises at least one feed hole (59) formed through the tubular support bush (41) and a groove (60) formed in the end wall (40).

8. The pumping unit according to claim 7, wherein the groove (60) projects from a base circumference of the gearing (44).

9. The pumping unit according to claim 7, wherein the pre-feed pump (7) further comprises an outlet (37b) for delivering the fuel to the high-pressure pump (6) and wherein the feed hole (59) has a longitudinal axis (61) arranged at an angle (a) of between 50° and 130° with respect to a direction of a force (S) acting on the gearing (44) owing to a difference in pressure between the outlet (37b) and the intake (37a) of the pre-feed pump (7).

10. The pumping unit according to claim 1, wherein the high-pressure pump (6) comprises at least one cylinder (17) formed in the pump body (8) and slidably engaged by a piston (19); the second branch (48) comprising a first section extending from the pre-feed pump (7) to the pump body (8) of the high-pressure pump (6) and second section extending from the pump body (8) of the high-pressure pump (6) to the cylinder (17).

11. The pumping unit according to claim 7, wherein the pre-feed pump (7) further comprises an outlet (37b) for delivering the fuel to the high-pressure pump (6) and wherein the feed hole (59) has a longitudinal axis (61) arranged at an angle (a) of between 90° and 130° with respect to a direction of a force (S) acting on the gearing (44) owing to a difference in pressure between the outlet (37b) and the intake (37a) of the pre-feed pump (7).

12. The pumping unit according to claim 7, wherein the pre-feed pump (7) further comprises an outlet (37b) for delivering the fuel to the high-pressure pump (6) and wherein the feed hole (59) has a longitudinal axis (61) arranged at an angle (a) of between 90° and 123° with respect to a direction of a force (S) acting on the gearing (44) owing to a difference in pressure between the outlet (37b) and the intake (37a) of the pre-feed pump (7).

13. The pumping unit according to claim 2, wherein a pressure of the fuel in the fourth branch (55) is greater than a pressure of the fuel at the intake (37a) of the pre-feed pump (7).

14. The pumping unit according to claim 13, wherein the first branch (47) is provided with at least a first constriction (47a) so that the pressure of the fuel at the intake (37a) of the pre-feed pump (7) is slightly below atmospheric pressure and wherein the fourth branch (55) is configured so that the pressure of the fuel in the fourth branch (55) is slightly above atmospheric pressure.

15. The pumping unit according to claim 14, wherein the pump body (37) of the pre-feed pump (7) comprises a tubular support bush (41) engaged rotatably by the second portion (42) of the transmission shaft (36, 42); the fourth branch (55) extending through the pump body (8) of the high-pressure pump (6) so as to be connected to the tubular support bush (41).

16. The pumping unit according to claim 15, further comprising at least one hydraulic duct (58) formed through the pump body (37) of the pre-feed pump (7) and connected to the tubular support bush (41) and to the intake (37a) of the pre-feed pump (7).

17. The pumping unit according to claim 16, wherein the pre-feed pump (7) is a gear pump comprising a gearing (44) mounted on the second portion (42) of the transmission shaft (36, 42) and seated inside a cavity (39) formed in the pump body (37) of the pre-feed pump (7) and limited by an end wall (40); the hydraulic duct (58) being formed at least partly on the end wall (40).

18. The pumping unit according to claim 17, wherein the hydraulic duct (58) comprises at least one feed hole (59) formed through the tubular support bush (41) and a groove (60) formed in the end wall (40).

19. The pumping unit according to claim 18, wherein the groove (60) projects from a base circumference of the gearing (44), wherein the pre-feed pump (7) further comprises an outlet (37b) for delivering the fuel to the high-pressure pump (6) and wherein the feed hole (59) has a longitudinal axis (61) arranged at an angle (a) of between 50° and 130° with respect to a direction of a force (S) acting on the gearing (44) owing to a difference in pressure between the outlet (37b) and the intake (37a) of the pre-feed pump (7).

* * * * *